July 10, 1951     C. J. BURKLEY     2,559,591

METHOD FOR MAKING SAFETY TUBES

Filed July 30, 1948     2 Sheets-Sheet 1

*INVENTOR.*
CLEMENT J. BURKLEY

BY

*ATTORNEY*

July 10, 1951 C. J. BURKLEY 2,559,591
METHOD FOR MAKING SAFETY TUBES
Filed July 30, 1948 2 Sheets-Sheet 2
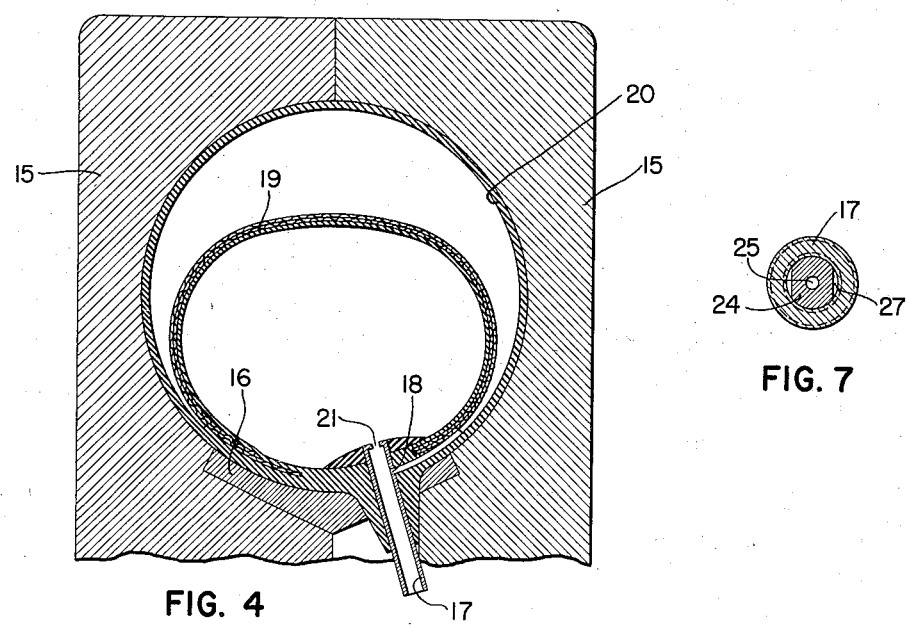
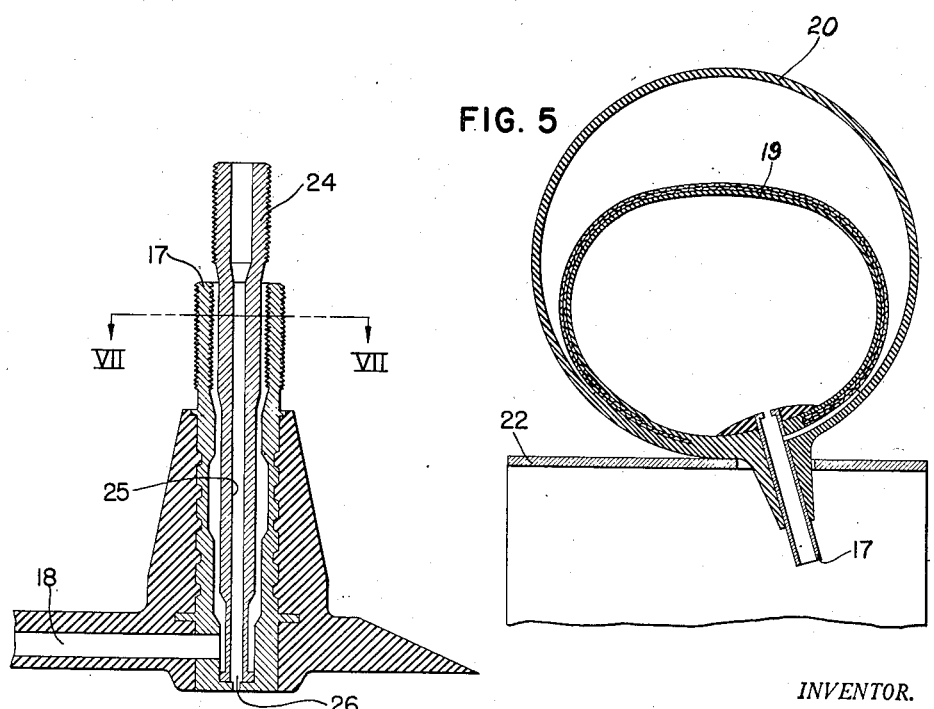
INVENTOR.
CLEMENT J. BURKLEY
BY
ATTORNEY Patented July 10, 1951

2,559,591

UNITED STATES PATENT OFFICE 2,559,591

METHOD FOR MAKING SAFETY TUBES

Clement J. Burkley, Akron, Ohio, assignor to Wingfoot Corporation, Akron, Ohio, a corporation of Delaware Application July 30, 1948, Serial No. 41,611

13 Claims. (Cl. 154—14)

This invention relates to methods and apparatus for making safety inner tubes of the type used with pneumatic tires, and, more particularly, is concerned with improved methods and apparatus for building and vulcanizing such tubes.

Heretofore, it has been the usual practice to construct safety inner tubes by a method which includes partially vulcanizing certain of the tube elements before assembly of the elements into the safety tube, with the complete safety tube being given a final vulcanizing operation. Such methods, while reasonably satisfactory, are open to the objection that they are relatively expensive, and time consuming. Moreover, known operations and apparatus for building safety tubes are susceptible to improvements to increase building speeds, reduce labor, and to improve the product.

It is the general object of the invention to avoid and overcome the foregoing and other difficulties of and objections to known building methods and apparatus for making safety tubes by the provision of improved methods and apparatus for facilitating the construction and vulcanization of safety tubes.

Another object of the invention is to provide a single cure process for the manufacture of safety tubes of the character indicated.

Another object of the invention is the provision of an improved building drum for facilitating safety tube construction.

Another object of the invention is to provide controlled inflation of the parts of the safety tube after vulcanization whereby the correctness of the tube construction is determined.

Another object of the invention is to provide a process for making safety tubes wherein the carcass tube is vulcanized simultaneously with the chamber tube.

Another object of the invention is to provide an improved series of steps for building a safety tube whereby the cost of the building operation is reduced, the operations are simplified, and the resulting product is bettered.

The foregoing objects of the invention, and other objects which will become apparent as the description proceeds, are achieved by the provision of a building method which includes the steps of building a fabric reenforced carcass tube, securing a band of rubber at its edges to the rim portion of the carcass tube so that the band of rubber surrounds the carcass tube as a chamber tube and in spaced relation to the side walls and tread portion of the carcass tube, positioning the safety tube thus provided in a vulcanizing mold, inflating the chamber tube and the carcass tube and vulcanizing the safety tube. Adjacent the end of the vulcanizing cycle, the carcass tube only is inflated and the chamber tube is connected to the atmosphere and the safety tube is held in such position substantially until it cools. This reinflating of the carcass tube usually takes place after the safety tube is removed from the vulcanizing mold.

The improved apparatus of the invention comprises a building drum having axially-flat, circumferentially-circular portions of slightly different diameters positioned side by side.

For a better understanding of the invention, reference should be had to the drawings wherein;

Fig. 4 is a cross-sectional view through the safety tube built in accord with the preceding illustrations and positioned in a vulcanizing mold, and illustrating the position of the tube parts during vulcanization;

Fig. 5 is a view similar to Fig. 4 but illustrating the arrangement of parts in the tube during the cooling of the tube and after it has been removed from the vulcanizing mold;

Fig. 6 is an enlarged longitudinal sectional view through the valve stem associated with the safety tube and illustrating the arrangement of the valve stem insert during the cooling of the vulcanized tube;

Fig. 7 is a transverse sectional view taken on line VII—VII of Fig. 6; and

Figure 1:
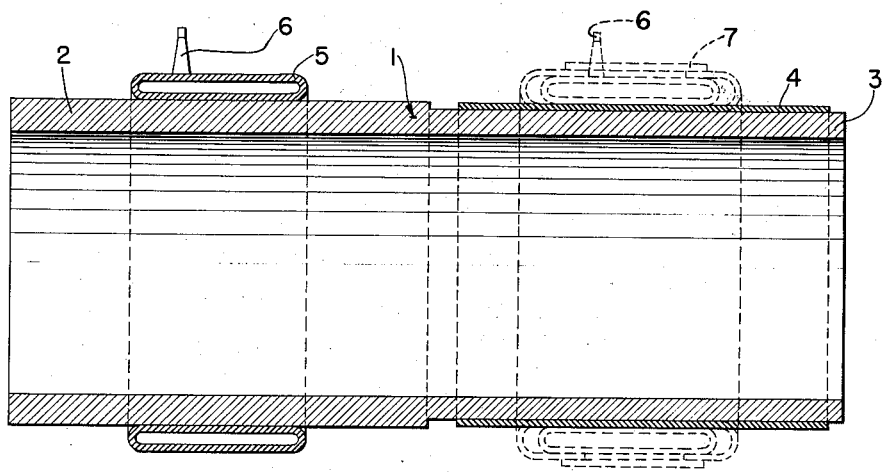
Fig. 1 illustrates in longitudinal diametric section the improved building drum of the invention, with parts of a safety tube being illustrated thereon.

Having reference to Fig. 1 of the drawings, the numeral 1 indicates diagrammatically a building drum which is adapted to be mounted upon a centrally positioned shaft (not shown), the shaft and drum being adapted to be rotated by any suitable mechanism, which has not been illustrated inasmuch as it forms no part of the present invention. The drum 1 is characterized by having a plurality, usually two, of axially-flat, circumferentially-round portions 2 and 3 of slightly different diameters positioned side by side on the drum. This is important for the reason that the difference in diameters of the portions 2 and 3 of the drum facilitates the construction of the safety tube. It should be noted, however, that many of the advantages of the inventive methods are retained even though a uniform diameter drum is employed in the building operation.

More particularly, the smaller diameter portion 3 of the drum is adapted to have built thereon an endless band 4 of rubber, this band being adapted to form the outside or chamber tube of the safety tube. The larger diameter portion 2 of the drum is adapted to have built thereon a carcass tube 5, which is the inside tube of the safety tube, the carcass tube 5 being adapted to be reinforced by rubberized fabric, usually in the form of two bias cut, alternately laid plies of rubberized fabric which are built into the carcass tube to reenforce it, or with the layers of bias cut fabric themselves forming the body of the carcass tube. Usually the fabric reenforces the carcass tube at all points except a narrow portion of the tube extending around the rim side of the carcass tube. The carcass tube includes a valve stem 6.

After the flat, all-rubber band 4 has been built on the drum portion 3, and after the carcass tube 5 has been built on the large diameter drum portion 2, then it is a simple matter and part of the inventive concept to move the carcass tube 5 laterally off of the drum portion 2 and over the smaller diameter band 4 on the drum portion 3 to a position near the center of the band. The movement of the carcass tube 5 and the positioning of the carcass tube on the endless band of rubber 4 is facilitated, as will be evident, by the slightly larger diameter of the carcass tube due to the difference in diameter of the drum portions 2 and 3.

After the carcass tube 5 is positioned over the band 4, the edges of the band are folded inwardly over the top of the carcass tube, as shown in dotted lines, and the edges of the band 4 are secured to the carcass tube adjacent the edges of the fabric of the carcass tube. It will be understood that the central portion of the band 4, or the radially inner and the side portion of the carcass tube 5, or both, are suitably treated so that the band 4 will not join to the carcass tube except where the edges of the band 4 are secured to the carcass tube. An extra strip of rubber 7 may be applied to the assembly to bridge the edges of the band 4 in the manner shown at the right hand side of Fig. 1, or the band 4 may be wider to overlap at its edges on the carcass tube 5.

After the assembly of the band 4, and the carcass 5, the safety tube assembly thus provided is turned so that the valve stem 6 extends radially inwardly and the portion of the tube which has engaged with the drum lies radially outermost. Then the assembled safety tube is vulcanized in a manner which will be described hereinafter.

As previously stated, it is not necessary to have the drum stepped as shown in the drawing as the drum can be of a uniform diameter. With the uniform diameter drum the flat band and the carcass tube can be built at different axially spaced positions and then the carcass tube stretched somewhat in order to slide it over the endless band. For this purpose it may be advisable to soap stone the band before the carcass tube is slipped over the band. The edges of the band are then brought up around the carcass tube. It is also possible to have a drum somewhat shorter than necessary to build both the band and carcass tube simultaneously and proceed by first building the carcass tube and then sliding it toward one edge of the drum out of the way, after which the flat band is built on a clear portion of the drum and then the carcass tube slid over the endless band as previously described. With such a process it is possible to use building drums of conventional size or at least of a size that will fit existing tube building machines wtihout material alterations.

Figure 8:
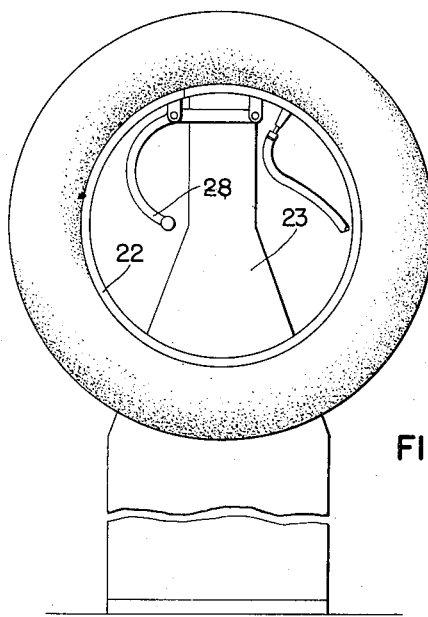
Fig. 8 is a front elevation of a typical apparatus for supporting the vulcanized tube during cooling.

The details of the valve stem structure and position have not been illustrated or described inasmuch as these are usually similar to those shown in Fig. 8 of the Clement J. Burkley Patent No. 2,253,759.

Before discussing the matter of vulcanization, at least one method of building the safety tube will be more particularly explained. Specifically, in Figs. 2 and 3 is illustrated one building method.

In these figures, the numeral 8 indicates a building drum, for example, a larger diameter portion of a building drum which may have several portions of slightly different diameter as heretofore described. There is first applied to the building drum 8 a band of rubberized fabric, such band being indicated by the numeral 9, and comprising, for example, a bias cut rubberized fabric layer. Applied over the band 9 is a second unvulcanized bias cut rubberized fabric band 10, which preferably is off-set laterally in the manner shown in Fig. 2 with respect to the band 9 and with the cords of band 10 running at an angle opposite to the cords of band 9. There is then applied to the edge of the band 10 an unvulcanized rubber band 11, this band being appropriately cut in association with a notch 12 in the bands 9 and 10, so that a valve stem, indicated by the numeral 13, may be associated with the notched portion. The laminated structure thus provided and illustrated in Fig. 2 (with the parts being shown somewhat exaggerated in thickness) is then manipulated to turn up the edges of the band in the manner shown in Fig. 3. An unvulcanized all-rubber band 14 is then stitched or otherwise applied over the edges of the turned up band and the valve stem 13 is applied so as to provide the structure shown in Fig. 3.

Figure 2:
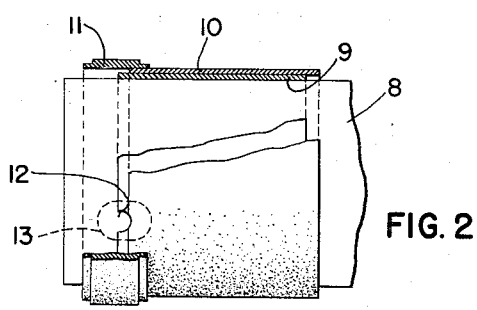
Fig. 2 is a fragmentary side elevation partially illustrated in longitudinal section, of a method and apparatus for building a safety tube.
Figure 3:
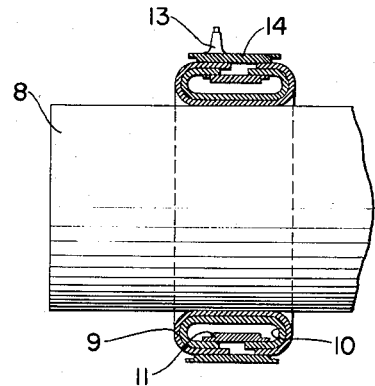
Fig. 3 is a view similar to Fig. 2 but illustrating the next step in the building of the tube.

It will be understood that the entire surface except the edges of the band assembly of Fig. 2 will be soap-stoned or otherwise treated so that when folded into a tube the inside walls of the tube will not stick together.

The completed carcass tube thus provided is adapted to be moved laterally over an all-rubber band, for example, of the type indicated by the numeral 4 in Fig. 1. The all-rubber band adapted to form the chamber or outside tube of the safety tube is then formed around the carcass tube in the manner heretofore described.

The safety tubes constructed in the several ways heretofore described are now ready for vulcanization. This is achieved in the manner diagrammatically illustrated in Fig. 4, namely, by positioning the complete safety tube in a two part mold 15, the mold preferably including a supporting ring 16 which engages with the rim portion of the safety tube, the support ring 16 being received in complementary recesses in the mold parts in the manner illustrated. Pressure fluid, in gaseous or liquid form, preferably gaseous, is introduced through the valve stem 17 of the safety tube, and this pressure is adapted to flow through the lateral opening 18 in the valve stem into the space between the carcass tube 19 and the chamber tube 20 and through the axial valve stem opening 21 into the carcass tube. This pressure fluid thus moves the chamber tube 20 out into tight pressure contact with the mold cavity, and, simultaneously, expands the carcass tube 19 to toric shape in which position it stays even after the pressure equalizes itself on both sides of the carcass tube.

The mold 15 is now subjected to vulcanizing temperatures of the desired degree and for the desired time to effect the vulcanization of the carcass tube and the chamber tube, and it may sometimes be advisable to construct the carcass tube 19 of compounds which vulcanize somewhat more rapidly than the compounds of the chamber tube 20 in order to insure the complete and uniform vulcanization of the entire safety tube in a single operation. However, even though the carcass and chamber tubes are constructed from the same compounds, it has been found that the single curing operation described effects quite satisfactory and uniform vulcanization of the entire safety tube. It may sometimes be desirable to use inside pressure fluid which has been heated to a desired temperature to assist in the vulcanizing operation. However, this is not essential.

Referring now to Figs. 5 and 8, an important part of the invention is to hold the carcass tube 19 to its true toric shape as it cools after the vulcanizing operation. This is accomplished by introducing fluid under pressure to the interior of the carcass tube 19 immediately after the vulcanizing operation. For example, after the vulcanizing operation, the vulcanized safety tube is first deflated and then removed from the vulcanizing mold 15, after which it is mounted on a collapsible drum 22 carried by a stand 23 and positioned closely adjacent the vulcanizing mold. Fluid, usually air, is then introduced through the valve stem 17 to the tube so as to re-inflate the carcass tube 19 with a fluid pressure in the amount of approximately four pounds per square inch. At this same time, the chamber tube 20 has its interior connected to the atmosphere. The result is that when the several parts of the safety tube are subjected to the indicated pressure, and left in this position until the complete safety tube has substantially cooled, then the carcass tube 19 is given a set in its toric shape which it will retain in handling and shipment so as to have the full bodied feel and appearance requisite to a safety tube of the dual chamber type. During this state of cooling down, the heat remaining in the carcass tube tends to further vulcanize the carcass tube although most of the curing is done in the mold.

Moreover, the operation just described has the additional function of testing the safety tube. This is achieved by the fact that if the safety tube carcass is leak-proof, it will be round and firm when inflated and the chamber tube open to the atmosphere will be soft to the feel of an operator. If, however, the carcass tube leaks, the chamber tube will be much stiffer with internal air pressure because air bleeds out to the atmosphere through the valve stem relatively slowly.

The adapter 24, illustrated in Figs. 6 and 7, is screwed into the valve stem 17 at the time the carcass 19 is to be re-inflated. Then fluid supplied under pressure to the adapter 24 passes through the bore 25 of the adapter and through the opening 26 into the carcass tube 19 to establish in the carcass tube the desired internal pressure, such as the four pounds per square inch previously mentioned. At the same time, the air or other pressure fluid in the interior of the chamber tube 20 passes out of the passage 18 up through the valve stem 17 out the flats 27 on the adapter to the atmosphere to connect the interior of the chamber tube to the atmosphere. This deflating operation is generally referred to as bleeding.

Once the safety tube has cooled with the carcass inflated as described, and the testing of the tube in the manner set forth is completed, then the tube is removed from the drum 22 of Fig. 8, and this operation is facilitated by operating handle 28 to collapse the drum. The restrictions in the valve stem of the tube cause the air to escape slowly, even after the adapter is removed, and hence collapsing the drum speeds up removal of the tube. The tube is now prepared for final packaging.

From the foregoing, it will be recognized that the various objects of the invention have been achieved by the provision of improved methods and apparatus for manufacturing safety tubes of the dual chamber type. An improved building drum has been provided having portions of different diameters to facilitate the building and assembly of the various parts of the safety tube. Several simplified building operations have been described for building safety tubes, and improved vulcanization and setting methods for use in conjunction with the building methods have been described which render possible the single cure vulcanization of the dual chamber type of safety tube.

While in accord with the patent statutes, certain best known embodiments of the invention have been illustrated and described in detail, it is to be particularly understood that the invention is not limited thereto or thereby, but that the scope of the invention is defined in the appended claims.

What is claimed is:

1. That method of making a double chamber tube of the safety type for use with pneumatic tires which includes the steps of forming an endless, airtight carcass reenforced with fabric, forming an endless flat band of rubber or slightly smaller diameter than the inside diameter of the carcass, moving the carcass sideways onto the band near the center thereof, folding the band around the carcass and securing the edges of the band only to the carcass to form a rubber chamber around the carcass, reversing the safety tube thus formed, placing the tube in a vulcanizing mold, inflating the chamber and the carcass to move the chamber walls out against the mold and to inflate the carcass to toric shape, vulcanizing the tube, deflating the carcass and the chamber, removing the tube from the mold, supporting the tube on a ring, inflating the carcass with a positive pressure and bleeding the chamber to substantially atmospheric pressure, and supporting the tube as last described until it is substantially cool.

2. That method of making a double chamber tube of the safety type for use with pneumatic tires which includes the steps of forming an endless, airtight carcass reenforced with fabric, forming an endless flat band of rubber, moving the carcass sideways onto the band near the center thereof, folding the band around the carcass and securing the edges of the band only to the carcass to form a rubber chamber around the carcass, reversing the safety tube thus formed, placing the tube in a vulcanized mold, inflating the chamber and carcass to move the chamber walls out against the mold and to inflate the carcass to toric shape, vulcanizing the tube, deflating the carcass and the chamber, removing the tube from the mold, supporting the tube on a ring, inflating the carcass with a positive pressure and bleeding the chamber to substantially atmospheric pressure, and supporting the tube as last described until it is substantially cool.

3. That method of making a double chamber tube of the safety type for use with pneumatic tires which includes the steps of forming an endless, airtight carcass reenforced with fabric, forming an endless flat band of rubber, folding the band around the carcass and securing the edges of the band only to the carcass to form a rubber chamber around the carcass, mounting the safety tube thus formed on a ring, placing the ring and tube in a vulcanizing mold, inflating the chamber and the carcass to move the chamber walls out against the mold and to expand the carcass to toric form, vulcanizing the tube, deflating the carcass and the chamber, removing the tube from the mold, supporting the tube on a ring, inflating the carcass with a positive pressure and bleeding the chamber to substantially atmospheric pressure, and supporting the tube as last described until it is substantially cool.

4. That method of making a double chamber tube of the safety type for use with pneumatic tires which includes the steps of forming an endless, airtight carcass reenforced with fabric, forming an endless flat band of rubber, folding the band around the carcass and securing the edges of the band only to the carcass to form with a portion of said carcass a chamber around the carcass, placing the tube in a vulcanizing mold, inflating both the chamber and the carcass to move the chamber walls out against the mold and to expand the carcass to toric form, and vulcanizing the tube.

5. That method of making a double chamber tube of the safety type for use with pneumatic tires which includes the steps of forming an endless, airtight carcass reenforced with fabric, forming an endless flat band of rubber of slightly smaller diameter than the inside diameter of the carcass, moving the carcass sideways onto the band near the center thereof, folding the band around the carcass and securing the edges of the band only to the carcass to form a rubber chamber around the carcass, reversing the safety tube thus formed, and vulcanizing the safety tube.

6. That method of making a safety tube which includes the steps of building a fabric reenforced carcass tube, securing a band of rubber at its edges to the rim portion of the carcass tube and so the band of rubber surrounds the carcass tube as a chamber tube in spaced relation to the sidewalls and tread portion of the carcass tube, positioning the safety tube thus provided in a vulcanizing mold, inflating the chamber tube and the carcass tube, vulcanizing the safety tube, deflating the carcass tube and the chamber tube, removing the safety tube from the mold, inflating the carcass tube while it is still warm, connecting the chamber tube through the tube valve stem to the atmosphere, and holding the tubes in the stated condition until they cool.

7. That method of making a safety tube which includes the steps of building a fabric reenforced carcass tube, securing a band of rubber at its edges to the rim portion of the carcass tube so that the band of rubber surrounds the carcass tube as a chamber tube in spaced relation to the sidewalls and tread portion of the carcass tube, positioning the safety tube thus provided in a vulcanizing mold, inflating the chamber tube and the carcass tube, vulcanizing the safety tube, deflating the carcass tube and the chamber tube, removing the safety tube from the mold, inflating the carcass tube while it is still warm, and holding the carcass tube inflated until it cools.

8. That method of building safety tubes adapted for use with pneumatic tires which includes the steps of making an endless, flat, unvulcanized rubber band, building an endless, fabric-reenforced carcass tube of unvulcanized rubber of larger internal diameter than the band, sliding the carcass tube laterally to surround the band substantially centrally thereof, folding the edges of the band over the carcass tube and securing the edges of the band to the tube, turning the assembly thus provided so that the area of joinder of the band to the carcass tube is at the rim side of the assembly, and vulcanizing the assembly.

9. That method of building safety tubes adapted for use with pneumatic tires which includes the steps of making an endless, flat, unvulcanized rubber band, building an endless, fabric-reenforced carcass tube of unvulcanized rubber in concentric axially spaced relation to said band, sliding the carcass tube laterally over the band to a position substantially centrally thereof, folding the edges of the band over the carcass tube and securing the edges of the band to the tube, and vulcanizing the assembly.

10. That method of making a safety tube having a fabric-reenforced central carcass tube and a surrounding chamber tube, said tubes being secured together at their base portions, which includes the steps of inflating the tubes, vulcanizing the tubes in a mold, deflating the tubes, removing the vulcanized safety tube, inflating the still hot carcass tube, connecting the chamber tube to the atmosphere and retaining the carcass tube expanded substantially until it has cooled.

11. That method of building a safety tube which includes the steps of building a flat tubular band and a fabric-reenforced endless carcass tube on the same building drum at different axially spaced positions thereon, sliding the carcass tube over said band and bringing the free edges of the band over the outer surface of the carcass tube to provide an outer chamber encircling the carcass tube.

12. That method of building a safety tube which includes the steps of building at spaced axial positions on coaxial surfaces, a flat tubular band and a fabric-reenforced endless carcass tube, sliding said carcass over said band and bringing the free edges of the band over the outer surface of the carcass tube to provide an outer chamber encircling the carcass tube.

13. That method set forth in claim 12 in which the coaxial surface on which the band is built is of less diameter than that on which the carcass tube is built.

CLEMENT J. BURKLEY.

REFERENCES CITED

The following references are of record in the file of this patent:

UNITED STATES PATENTS

| Number | Name | Date |
|---|---|---|
| 1,472,756 | Henderson | Oct. 30, 1923 |
| 1,694,238 | Stevens | Dec. 4, 1928 |
| 1,713,958 | Fleischli et al. | May 21, 1929 |
| 2,090,210 | Lee | Aug. 17, 1937 |
| 2,305,053 | Zimmerman | Dec. 15, 1942 |
| 2,372,382 | Krusemark | Mar. 27, 1945 |

Certificate of Correction

Patent No. 2,559,591

July 10, 1951

CLEMENT J. BURKLEY

It is hereby certified that error appears in the printed specification of the above numbered patent requiring correction as follows:

Column 6, line 37, for "rubber or" read *rubber of*; line 65, for "vulcanized" read *vulcanizing*;

and that the said Letters Patent should be read as corrected above, so that the same may conform to the record of the case in the Patent Office.

Signed and sealed this 30th day of October, A. D. 1951.

[SEAL]

THOMAS F. MURPHY,
*Assistant Commissioner of Patents.*